CHARLES SCHLABS
INVENTOR.

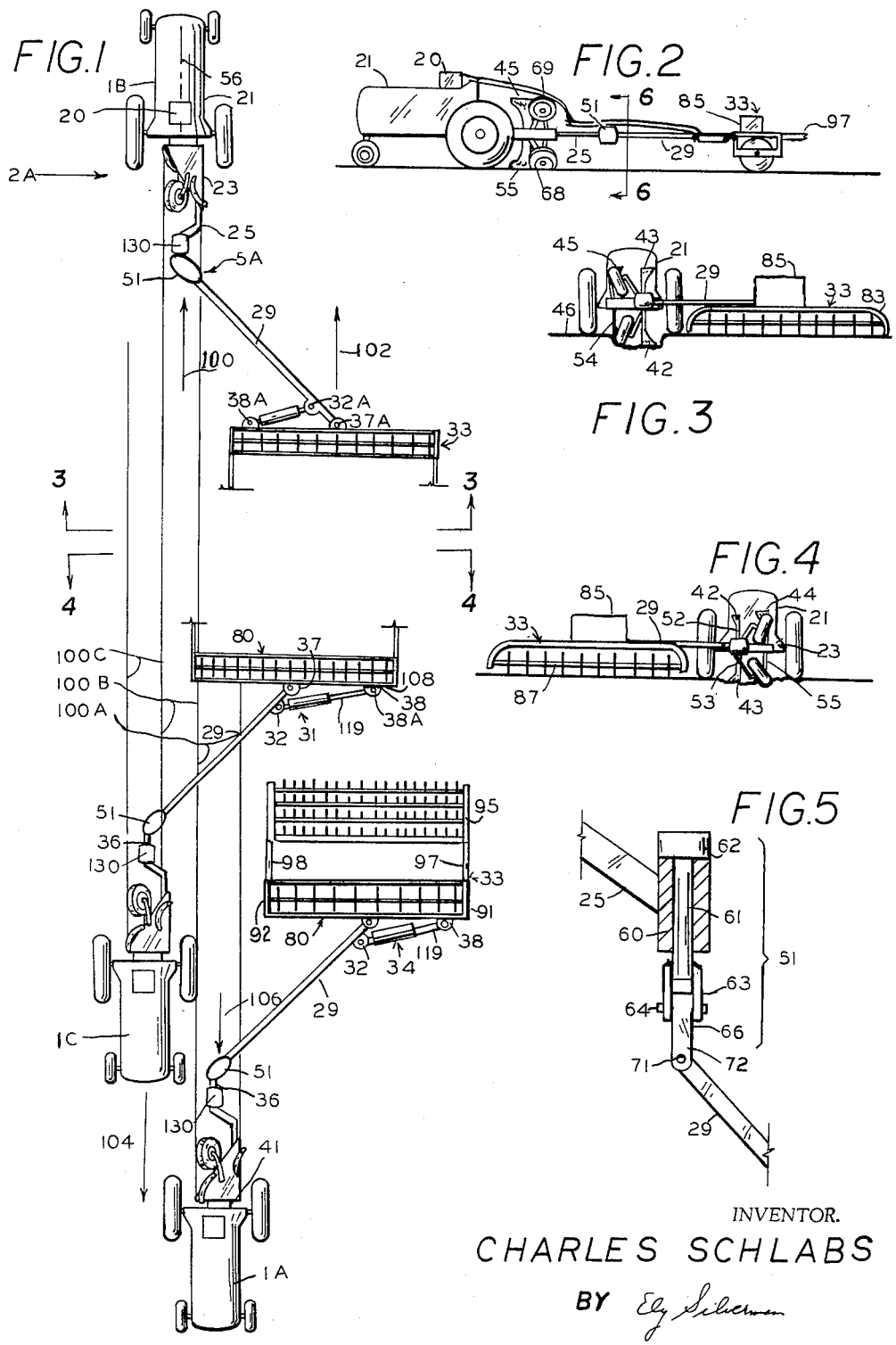
Feb. 1, 1966    C. SCHLABS    3,232,354
ALTERNATING IMPLEMENT EARTHWORKING PROCESS
AND APPARATUS THEREFOR
Filed Nov. 6, 1964    3 Sheets-Sheet 1
INVENTOR.
CHARLES SCHLABS
BY Ely Silverman
ATTORNEY

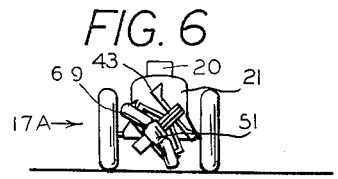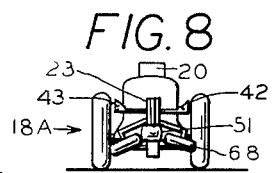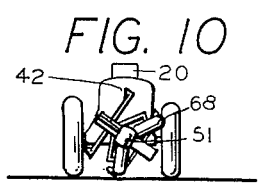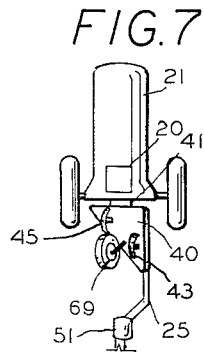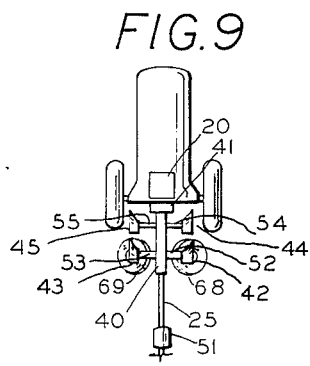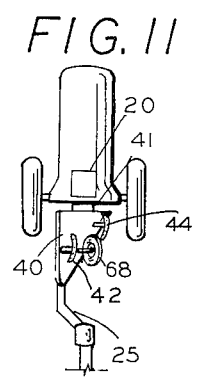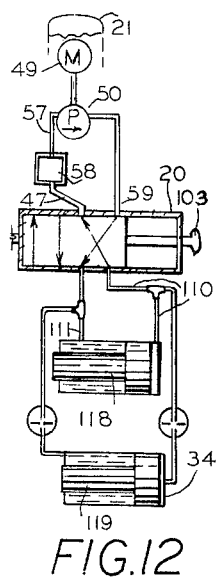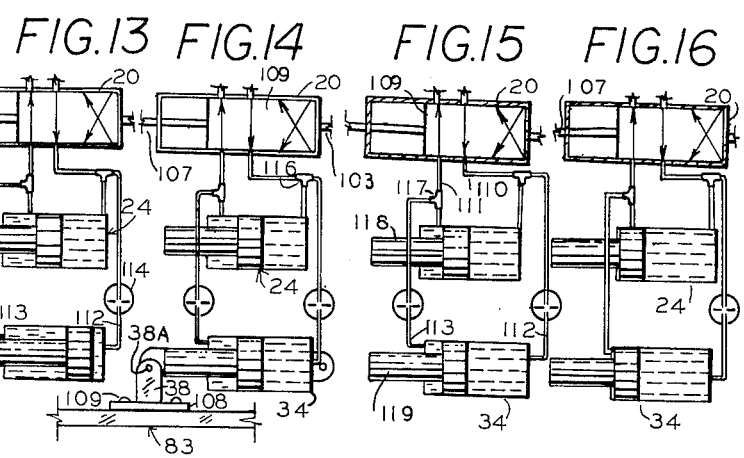
INVENTOR.
CHARLES SCHLABS
BY
*Ely Silverman*
ATTORNEY

BY Ely Silverman
ATTORNEY

United States Patent Office 3,232,354
Patented Feb. 1, 1966

3,232,354
ALTERNATING IMPLEMENT EARTHWORKING PROCESS AND APPARATUS THEREFOR
Charles Schlabs, Rte. 2, Hereford, Tex.
Filed Nov. 6, 1964, Ser. No. 409,432
5 Claims. (Cl. 172—162)

This application is a continuation-in-part of my copending application Ser. No. 264,000 filed March 8, 1963, now Patent No. 3,183,981.

This invention relates to an improvement in an earth working process and apparatus therefor using alternating implements. More particularly, this invention relates to an improvement in the use of two-way plows and other assemblies used concurrently therewith.

In preparing seed beds for planting with a mouldboard plow the plow cuts the soil loose from the furrow and shatters and inverts the furrow slice, and thereby opens the earth for infiltration of water and aeration. Where there are crop residues they may be cut up and removed, however, sod crops are usually plowed under without cutting or removing. The plowing of soil with sod crops thereon thus produces firm clods and some pulverized soil. The amount of pulverization and furrowing produced by plowing generally depends on the mouldboard steepness, the soil properties, and the path of the soil on the mouldboard during the operation of the plow. The path of the soil on the mouldboard in turn depends on the direction and speed of plowing and the stiffness and friability of the soil. Accordingly, the product of the plowing operation—especially with the varied bulk densities of the clods produced by plowing land with sod crops thereon—requires further treatment, such as harrowing, to make an evenly divided and pulverized seedbed.

According to the process and apparatus of this invention plowing and harrowing in one continuous and concurrent operation is made convenient, efficient, and economical using a conventional two-way plow and other apparatus. This process and apparatus not only avoids the differential effects of rain and sun on relatively hard clods and on relatively soft residues produced by conventional plowing operations during the usual interval between stages in seedbed preparation but also avoids the necessity of separate time-consuming field operations that are not only expensive and further require hauling of earth working implements over plowed and harrowed land, the weight of which implements produces undesirable and unevenly distributed compaction especially of plowed sod and residue. According to the apparatus and arrangement of this invention, the large clods and residue of uneven bulk density produced by conventional plowing are further broken up in predetermined controllable and even fashion.

Further, the procedure provided by the apparatus of this invention provides for a minimum pulverization during the plowing operation, hence, a minimum power draft and a minimum time consumption for each earth-working step. This invention also provides a procedure and apparatus that produces a seedbed of controllable and predetermined desired looseness and density with a minimum of effect thereon by undesirable variable factors of weather on intermediate products of such treatment.

Accordingly, one object of this invention is to provide means whereby an earthworking implement disposed and drawn behind a rotatable two-way plow may be positively and articulated thereto in response to rotatable motion of that plow.

Another object of this invention is to provide a process and apparatus for synergistic cooperation of a two-way plow assembly and a harrow assembly associated therewith for operation thereof in a pattern providing efficient seedbed treatment.

Another object of this invention is to provide orientation and control means which permanently and reliably fix the position of a drawn earth treating implement relative to a rotatable plow during operation, which means are simple in construction and reliable in operation and provide a minimum of strain on the two-way plow structure and the operating means therefor.

Yet another object of this invention is to provide connections between a two-way plow and complementary earth treating implements to permit such complementary implements to remain on the ground as they are laterally translated.

Yet another object of this invention is to provide a harrow means in cooperative articulation with a two-way plow.

Other objects of this invention will be apparent to those skilled in the art on study of the below description, of which description the accompanying figures form a part and in all of which figures the same numerals refer to the same parts throughout and wherein:

FIGURE 1 is a top plan view showing the components forming the combination of apparatus of this invention in various positions during the procedure and pattern of earth treatment accomplished thereby;

FIGURE 2 is a side view of the combination of apparatus of this invention as seen along the direction of the arrow 2A of FIGURE 1;

FIGURE 3 is a rear view of the apparatus combination shown in FIGURE 1 of this invention as viewed along the plane 3—3 of FIGURE 1;

FIGURE 4 is a rear view of the apparatus in position 3 in the operation shown in FIGURE 1 showing the combination of apparatus of this invention operating with the harrow to the left-hand side of the tractor as viewed along plane 4—4 of FIGURE 1;

FIGURE 5 is an enlarged perspective view of the joint 51 in the zone 5A of FIGURE 1;

FIGURE 6 is a rear view of the apparatus of FIGURE 1 as viewed along the plane 6—6 of FIGURE 2 during an initial phase of counterclockwise rotation of the boom 25 and related rotatable parts;

FIGURE 7 is a top view of the apparatus positioned as in FIGURE 6;

FIGURE 8 is a rear view of the apparatus of FIGURE 1 viewed as in FIGURE 6, but in a more advanced counterclockwise position of the boom 25 and related rotatable parts than shown in FIGURE 6;

FIGURE 9 is a top view of the apparatus positioned as shown in FIGURE 8;

FIGURE 10 is a rear view of the component parts of the appartaus of FIGURE 1 viewed as in FIGURE 6 and showing the component parts thereof in a stage of rotation in a counterclockwise direction more advanced than that shown in FIGURE 8;

FIGURE 11 is a top view of the apparatus positioned as shown in FIGURE 10;

Figure 17:
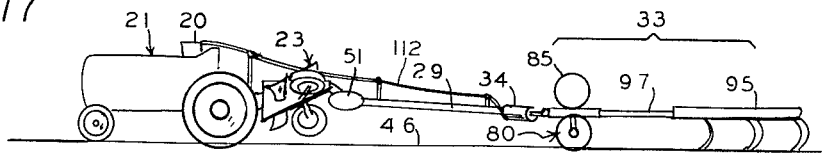
Figure 18:
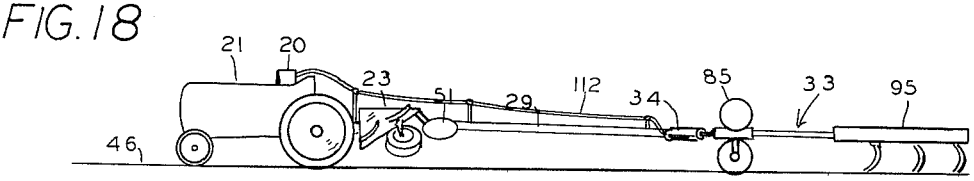

FIGURES 12, 13, 14, 15 and 16 respectively show diagrammatically the hydraulic connections in the conventional control box valve 20, the two-way plow subassembly, two-way hydraulic power cylinder, 24, and the two-way harrow positioning power cylinder, 34, at the position of the harrow subassembly 33 and the two-way plow subassembly 23 in the positions shown in FIGURES 3, 6, 8, 10 and 4;

FIGURE 17 is a side view of the apparatus of FIGURE 1 in the position of its component parts shown in FIGURE 6 as seen along the arrow 17A of FIGURE 6;

FIGURE 18 is a side view of the apparatus of FIG-

Figure 19:
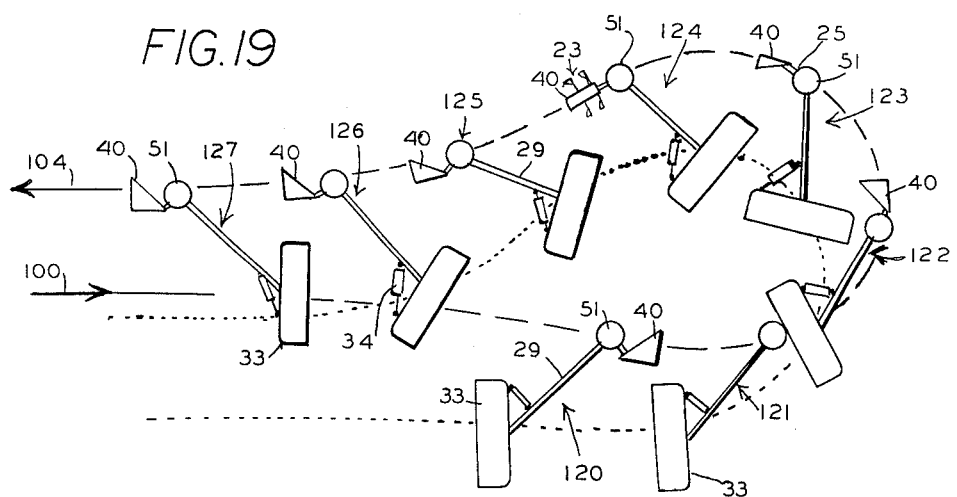

URE 1 in the orientation of its component parts as shown in FIGURE 8 and as seen along the direction of the arrow 18A of FIGURE 8; and FIGURE 19 diagrammatically shows the paths of the plow and harrow subassemblies during a turn wherein the direction of the travel of the plow is reversed and the harrow subassembly is moved from the right to the left side of the plow subassembly according to the process and apparatus of this invention.

Generally, the over-all combination of the apparatus of this invention comprises, in operative combination, a tractor 21, an earthworking implement subassembly 23 adapted for alternate left and right-hand operation, a boom 25, a universal joint 51, a link arm 29, an adjustable joint assembly 31 and a second earthworking implement subassembly 33, and hydraulic power cylinders 24 and 34.

In the particular preferred embodiment of this invention the tractor 21 is a conventional 50 H.P. tractor. The tractor 21 has a longitudinal axis running from its front to its rear and generally parallel to the direction of movement of such tractor.

Subassembly 23 is a hydraulically operated conventional two-way plow: such two-way plows are shown in U.S. Patents 1,467,894; 1,560,639; 2,227,366; 2,239,596; 2,543,786; 2,708,396; 2,913,059; and 3,087,556. The axis of rotation of such plows is located therein parallel to the longitudinal axis, as 56 of the tractor therefor as 21. Where the hydraulic actuation for the rotation of the plow is not expressly provided in such plows (as is expressly taught in U.S. Patent 3,087,556), i.e. when the patent teaches manual operation, as in Patent 2,239,596, the manual control lever, as item 29 in Patent 2,239,596, for rotation of the plow is actuated by a conventional hydraulic power cylinder, as 24; cylinder 24 is controlled by a control box valve 20 located on and supported on the tractor 21 at a location physically near and convenient to the operation of the tractor so that the operator may manually control the valve 20 and, thereby actuate the piston of power cylinder 24 and, thereby, rotate the plows of such two-way plow. Such a hydraulically operated two-way plow may also have other apparatus incorporated therein to tilt the coulter assembly thereof in the direction opposite to that in which the plow frame rotates as in U.S. Patent 2,708,396. In the preferred embodiment plow assembly 23 is a two-bottom two-way plow such as in U.S. Patent 2,913,059.

The boom 25 is a rigid elongated member which is permanently fixed to the rotatable plow subassembly with the boom located and shaped so that the rear end thereof lies on the axis of rotation of the rotatable subassembly. The point of permanent attachment or fixing of the boom to the plow subassembly also supports the boom so that no further ground contact is required by this member for the support thereof. A universal joint 51 between boom 25 and link 29 is located at the peripheral end 36 of the boom 25. The link element 29 is a nine foot long 2⅞" O.D. steel tube. The boom is a rigid steel beam about 2 feet long. A second assembly joint 31 joins the link 29 to the second ground working implement 33 which is, in the preferred embodiment, a harrow.

The tractor 21 has at its rear end a conventional tool bar 22 and supports on that tool bar 22 a two-way rotatable plow subassembly 23. The plow subassembly 23 comprises a rotatable platform 40 which is rotatably supported, as by an axle as 41 on the tool bar. Platform 40 is a sturdy steel, flat frame and supports at one flat side of said flat frame a pair of mouldboard plows 42 and 44 and a landside wheel 68: the other side of platform 40 supports similar plows 43 and 45 and landside wheel 69. The position and location of items 42, 44 and 68 are in mirror image relation to the position and location of items 43, 45 and 69. The rotatable platform 40 is, in the preferred embodiment, provided on its lower (as seen in FIGURES 3 and 6) side with two mouldboard plows 42 and 44 firmly mounted onto that rotatable platform for cutting and inverting the soil as 46 and throwing it to the right as shown in FIGURE 3. On the upper surface of the platform (as seen in FIGURES 3 and 6) a pair of mouldboard plows 43 and 45 are similarly mounted to provide for throwing the soil as 46 to the left as shown in FIGURE 4.

The rotatable plows as 42 and 44 are mounted on one side of the rigid platform 40 by rigid standards therefor as 52 and 54, respectively; similarly the plows 43 and 45 are mounted on platform 40 by rigid standards 53 and 55, on the other side of platform 40. A hydraulic power cylinder 24 is attached at one end to the platform 40 and tractor 21 at the other end and rotates platform 40 of subassembly 23 about axle 41 on an axis parallel to the longitudinal axis of tractor 21. The piston 24 is actuated and controlled by a conventional hydraulic control power cylinder 20 mounted on tractor 21. A conventional hydraulic fluid compressor pump 50 mounted on tractor 21 is driven by the conventional motor 49 of the conventional 50 H.P. tractor 21 and provides high pressure conventional hydraulic fluid to the conventional high pressure line 59 and to the conventional control box valve 20. Pump 50 is fed hydraulic fluid from input line 57; input line 57 is connected to a conventional hydraulic fluid reservoir 58 on tractor 21; valve 20 discharges hydraulic fluid by discharge line 47 into reservoir 58.

The path of travel, as 100, of the tractor as 21 is parallel to the longitudinal axis 56 of the tractor 21 and the longitudinal axis of the tractor 21 passes through the center line of the tractor and also between the standards as 52 and 54 for the plows in a plane equidistant from each of those standards. The length or longitudinal axes of standards 52 and 53 are coplanar and colinear with each other on opposite flat sides of the platform 40 and perpendicular thereto as are the longitudinal axes of the standards 54 and 55.

Boom 25 is a rigid arm that is rigidly connected at one, forward, end to the rear end of the frame 40 and extends rearwardly and centrally thereof towards the axis of rotation of said platform whereat the universal joint assembly 51 is located and affixed to the rear end, 36 of boom 25. The proximal end 35 of the boom 25 is fixed to the platform 40 and supports the boom so that no separate ground contacting support member is required by this boom.

During operation, as shown in positions 1A, 1B and 1C of FIGURE 1, the boom 25 is located with assembly 51 on the rearward extension of the longitudinal axis (56) of the tractor 21. In the preferred embodiment, the boom 25 is a 2⅞" O.D. pipe about 18 inches long.

Universal joint 51 is located at the proximal end of the link arm 29. The adjustable joint 31 rotatably joins the arm 29 to the second ground working implement 33 which is, in the preferred embodiment, a harrow.

The joint subassembly 51 comprises a cylindrical rocket 60 (2⅞" O.D., 2¼" I.D.), a 2¼" O.D. shaft 61 rotatably located therein, a shoulder 62 (2⅞" O.D.) at the front end of the shaft and a yoke 63 is firmly welded to the distal end of shaft 61. A horizontal pin 64 (in position shown in position 1B of FIGURE 1) pivotally joins the arms of yoke 63 to the body 66 of yoke 67. Yoke 67 journals distal vertical pin 71 (in position therein in position 1B of FIGURE 1) within the arms, as 72, of yoke 67. Pin 71 pivotally joins arm 29 to yoke 67.

The link arm 29 is a 9 foot long 2⅞" O.D. steel tubing of 5⁄16" wall thickness in the preferred embodiment. The inner or proximal end thereof is firmly joined to the yoke 72; the outer or distal end thereof is joined firmly through the second joint 31 to implement 33.

Joint 31 comprises a front pivot lug 32 an arm 29, an adjustable lateral pivot lug 38 on harrow 33, a two-way hydraulic power cylinder 34 between lugs 32 and 38 and a fixed pivot lug 37 on implement 33, and pivot pins 32A, 37A and 38A in each of the pivot lugs 32, 37 and 38 respectively. Pivot lug 32 is firmly attached to arm 29 with its pivot pin (32A) centered 1¼ inch to one side (the left) of the arm 29. Pivot pin 32A is cylindrical and located with its center, or axis of rotation, in the preferred embodiment, 6½ inches from the axis or center of pivot pin 37A in pivot pin lug 37. Lug 37 is located on the front of the frame of implement 33 while lug 37 is, in the preferred embodiment, 26 inches from the center of pin 38A: in this particular embodiment, cylinder 34 has an expanded length of 28¼" and a contracted length of 20¼" between axes of pins 32A and 38A.

The subassembly 33 comprises, in the preferred embodiment, a spiral harrow which contacts and works the earth. It provides 13 spirals extending across 7 feet of frame 83, which frame is 8½ feet wide. The spiral of the harrow has an outside diameter of 15". A water tank or reservoir 85 is firmly attached to the top of the rear frame 83 to supply sufficient weight as desired on the frame to press the blades of the harrow into the ground. The spirals are fixed at each 180° interval to a rotatable central shaft 87 about which the spirals rotate. The frame 83 is U-shaped and rotatably supports the central shaft in bearings at its lateral ends. In the preferred embodiment the frame 83 is made of 3" O.D. steel tubing.

A spring harrow 95 of 8 foot width is drawn by bars 97 and 98 attached to the upper portions of the lateral ends 91 and 92 of the frame 83.

By this invention the harrow 33 is as shown in FIGURE 1 at position 1B drawn forward in the general forward direction 100 of travel of the tractor; the arm 29 maintains the joint subassembly 31 above the level of the ground as pin 37A tightly fits lug 37.

The use of a disc harrow or a spiral harrow in combination with the rigid link arm 29 provides for maintaining the path 102 of the harrow 33 parallel to the path, as 100, of the tractor drawing it.

In operation the plow subassembly 23 is equipped with both left and right-hand bottoms. In the path 100 of FIGURE 1 the plows 52 and 54 of tractor 21 in position 1B throw the soil to the right while the harrow subassembly 33 then concurrently treats the earth previously plowed. During the next, alternate, path 104 which is traversed by the tractor 21 in position 1C the left-hand plows 43 and 45 throw the soil to the left of the tractor; this movement of the earth is in the same absolute direction as the earth was moved during the path of travel 100; the disc harrow and spring harrow behind it then move over the earth treated by the plow during the path 106 traversed by the tractor 21 in position 1A and which path preceded that of path 100. Plowed swathes 100A, 100B and 100C are made by travel of tractor 21 in positions 106, 100 and 104, respectively.

The lateral position of the longitudinal axis of the harrow 33 relative to the path of travel of the tractor is determined in part by the angle which the teeth of the harrow make with the longitudinal axis of the harrow, as well as the weight of the weightbox on the harrow and the speed of the tractor and also by the angular relations maintained by joint 31 and arm 29.

Joint assembly 31 maintains a fixed angular relationship between the longitudinal axis of arm 29 and the longitudinal axis of harrow 33 in the horizontal positions of arm 25 while it permits variation in such angle to be accomplished in the relatively vertical position of platform 40 during turning, as shown in FIGURES 6 through 11.

The tension along the link arm 29 and boom 25 are applied to the frame of the plow subassembly to the rear of the point whereat the mouldboard plows as 44 and 45 meet the ground. Accordingly, in the preferred embodiment of this invention, the tensile force along said boom and arm is applied along a line which has a torque arm of about 1 foot length. This torque, counterclockwise in the position shown in FIGURE 3, serves to counter and oppose the clockwise torque provided by action of the earth on the mouldboards in the position shown in FIGURE 3. Accordingly, the use of the assembly of this invention provides for reducing the force on the landside wheel as 68 and 69, also mounted on the platform 40.

A wheel 68 is provided to engage the ground during the operation of the mouldboard plows 42 and 44 against the earth while a landside wheel 69 is provided to contact the earth during operation of the mouldboard plows 43 and 45 on the ground.

Accordingly, the process and apparatus of this invention provides for reduction of the force of the landside wheel and an improved transmission of the power of the tractor to treatment of earth to improve its infiltration by water and aeration and to provide a seedbed of even bulk density as well as avoid compaction of the earth along the line of contact of the landside wheel with such earth.

The connection of the joint 31 provides for a fixed angular relation of the length of the arm 29 and the longitudinal axis of the subassembly 33. This provides a fixed distance between the longitudinal axis of the tractor and the longitudinal axis of the harrow for any given angle between (a) a straight line joining the axes of pins 32A and 37A and (b) a straight line joining the axes of pins 38A and 37A. Should the harrow, during its operation as in FIGURE 1 with the boom 25 in horizontal position as in FIGURE 1, attempt to move laterally the fixed relationship of the bar 29 and the longitudinal axis of the harrow and the "bite" of the harrow teeth on the ground, will result in that the harrow for any given condition of weight and of tractor speed will not move only laterally outwards or inwards to a translated position but also the longitudinal axis of the harrow will also rotate so that the harrow will return to operate at a predetermined distance from the longitudinal axis of the tractor. This control of the lateral distance of the path of the harrow from the path of the tractor is achieved by the fixing of the angular relations of the longitudinal axis of the harrow and the shaft 29 by the joint 31. By this invention the orientation of the harrow is fixed at any given speed of the tractor and loading of the harrow to provide a predetermined, constant reliable distance between the path of the plow and the path of the harrow and so provide for an evenness of soilbed treatment not heretofore obtainable.

This improved result is obtained by a very simple, reliable equipment which does not require raising of the auxiliary ground treating equipment as disc harrow 80 and spring harrow 95 off the ground as the desired orientation of the secondary equipment is obtained merely by translation of the harrow and any other earth treating machine following that harrow and, thereafter, the firm yet rotatable connection provided by the device of this invention provide an evenness of soil treatment and a synergism of such secondary soil treatment implements with the plow as has not heretofore been achieved.

According to this invention the subassembly 33 is moved from the right-hand position shown in FIGURE 3 to the left-hand position shown in FIGURE 4 by counterclockwise rotation of the boom 25. The boom is rotated counterclockwise as shown in FIGURE 6 from the position shown in FIGURES 2 and 3 while the subassembly 33 is still supported on the ground as shown in FIGURES 2 and 9. The link 29 then extends as shown in FIGURE 9 from the joint 51 to the joint 31. Further continued rotation of the boom 25 to the position shown in FIGURES 8 and 18 permits the boom to rotate to the left-hand position. Following this the boom is rotated to the position shown in FIGURES 10 and 4 and the subassembly 33 is still supported on the ground. Inasmuch as harrows, such as a spiral harrow or disc harrow, have a definite longitudinal direction through which they most freely move over the earth and through which they cut, the apparatus and process of this invention provides a simple and reliable method of controllably moving such supplementary earth seedbed preparing devices in cooperation with the action of a two-way plow.

According to this invention the plows are not required to complete turning and pulverization of the soil, especially lumpy soil produced by plowing of sod crops. This is because, according to this invention, the harrow cooperates with the plow not only to lessen the stress on the landside wheel and reduce the undesirable compaction of the earth and improve the efficiency of the power effectively and beneficially applied to the soil but also, according to this invention, the harrow completes the pulverization and even turning which action is, therefore, not required to be accompanied by the plow alone. As shown in FIGURE 1, according to this invention, the pattern of tillage developed is shown by the tractor paths 100, 104, 106. When the tractor is turned about from the path 100 with plows 42 and 44 in engagement with the ground to the path 104 with the plows 43 and 45 in engagement with the ground the harrow operates on the soil plowed previously without any additional operation on the part of the plow operator.

The path of the tractor, and plow subassembly and the path of the harrow subassembly 33 during a turn from travel in a first direction as along path 100 to travel in the opposite direction as along path 104 is diagrammatically shown in FIGURE 19. In this figure the path of the rotatable platform 40 of the tractor and plow subassembly is shown in the dashed line while the path of the harrow subassembly is shown by the dotted line during the successive positions of the component parts as 40, 24, 29 and 33 shown as positions 120, 121, 122, 123, 124, 125, 126 and 127 in FIGURE 19. According to the process and apparatus of this invention the tractor and plow subassembly 23 and harrow subassembly 33 traverse separate curved paths. As shown in FIGURE 19 during the initial part of the turn boom 25 is rotated counterclockwise as shown in FIGURES 6 to 11.

The harrow subassembly, as 33, always remains on the ground during turning. In turning to the left as shown in FIGURE 19, the harrow subassembly is initially located relative to the plow subassembly as shown at position 120, which corresponds to position 1B on FIGURE 1, on the right-hand side of the tractor 21. As the tractor begins to turn to the left the boom 25 is turned counterclockwise; the arm 29, in the vertical position of the boom 25 and joint 51 may then swivel about joint 51 and boom 25 notwithstanding the fixed angular relation between the boom 29 and the length of the laterally (relative to path 100) extending harrow 33; thereby the tractor and plow subassembly pass directly in front of the harrow 33 as shown at position 122. When the harrow is on the left-hand side of the tractor and with its longitudinal axis at somewhat less than 45° to the longitudinal axis (56) of the tractor, as at position 123 as well as at 125, which occurs on further leftward turning and forward motion of the tractor, the boom 25 is rotated counterclockwise further from the poistion of FIGURE 8 through the position of FIGURE 10 and to the horizontal left-hand position shown in FIGURE 4. Thereafter, rightward turning of the tractor and plow subassembly moves the harrow subassembly 33 further, relatively, from the left-hand side of the tractor as shown at point 126 of FIGURE 19. Movement forward in a straight line by the tractor and plow subassembly 23, due to the reaction of the straight boom 29 and the fixed angle joint 31, achieved as below described relative to the frame of subassembly 33 keeps the subassembly 33 a definite distance to the left-hand side of the tractor and plow subassembly as shown at position 127 of FIGURE 19 which corresponds to positions 1A and 1C in FIGURE 1 as above described.

It is within the scope of this invention that the angle at the joint 31 would be fixed by hydraulic means at any desired angle such as by a power cylinder 34 of variable length as well as by variation of position of the adjustable lug 38, and so further control the lateral distance of the longitudinal axis of the harrow or other supplementary earth treating machine relative to the path of the tractor and the plow or other primary earth treating apparatus used therewith. Nevertheless only a particular angular relationship is herein described.

In the maneuver shown in FIGURES 19, 3, 4, and 6 through 11, the axis of shaft 61 travels from its position shown in FIGURE 3 to the position shown in FIGURE 4 and ends in a position parallel to that and at the same vertical level (over ground 46) at which it began: in the preferred embodiment the axis of shaft 61 is also maintained in the vertical plane midway between the tractor wheels at its position shown in FIGURES 3, 4 and 6 through 11.

The universal joint 51 permits that the subassembly 33 may be translated transversely relative to axis 56 of tractor 21 without rotation or any substantial tilting of the frame 83 about its horizontal longitudinal axis (running from end 91 to 92 of frame 83). This minimizes the mechanical work done by moving joint 51 from the FIGURE 3 to the FIGURE 4 position hereinabove described and minimizes the mechanical strain on the apparatus supporting the conventional two-way plow subassembly 23 above the ground on the tool bar or other part of the tractor 21 during the rotation of the platform 40 (or other equivalent plow support) and the plows as 42, 43, 44, and 45 about the axle 41 during reversal of the plow positions as shown in FIGURES 6 through 11, 17, 18 and 19. The joint 51 is maintained at substantially the same vertical level during its rotation from its position of FIGURE 3 to position of FIGURE 4 by locating the axis of shaft 61 coaxial with the axis of rotation of subassembly 23, i.e., co-axial with the longitudinal axis of axle 41 in the preferred embodiment herein described, yet close behind the rear plows 42 and 43. This closeness increases the counterclockwise torque of subassembly 33 on subassembly 23 through the (hydraulically) fixed joint 31 and arm 29.

Conventional flexible hydraulic lines 110 and 111 connect valve 20 with cylinder 24 and conventional hydraulic lines 112 and 113 connect lines 110 and 111 to cylinder 34 via conventional T's 116 and 117. Lines 110, 111, 112 and 113 are each ⅜ inch internal diameter flexible hydraulic lines. Orifice plates 114 and 115 each 3⁄32 inch internal diameter are located in each of lines 112 and 113 adjacent T's 116 and 117, respectively. T's 116 and 117 are located between cylinder 24 and valve 20. Cylinders 24 and 34 are each of 2 inch internal diameter. The valve 20 passes fluid to the cylinder 24 and so holds the subassembly 23 in fixed position, rotated clockwise in the position shown in FIGURE 3 and cylinder 34 is concurrently held in its contracted position, as shown in FIGURE 1 at position 1B. The piston 118 of cylinder 24 is then in its contracted position and piston 119 of cylinder 34 is in contracted position.

To perform a leftward turn as shown in FIGURE 19, valve 20 is adjusted manually by the operator of the tractor 21 to a position whereat high pressure fluid is applied to pistons 118 and 119 to bring both to their extended position. Due to the orifice plates 114 and 115, cylinder 24 reaches a semi-extended position slightly prior in time to the beginning of movement of the piston 119 of cylinder 34; this evens out the work load borne by pump 50 and avoids stalling. Also, coordination of the application of high pressure fluid to expand cylinder 24 with the path of the tractor in its turn to apply the high pressure fluid to expand cylinder 24 after the tractor has begun to turn, i.e., at position 121 of FIGURE 19, provides that the forward urging force of the pull of the tractor 21 on subassembly 33 and the resistance of the ground 46 to the forward movement of the implement subassembly 33 aids in the lateral or sideways translational movement of implement subassembly 33 relative to (the longitudinal axis 56 of) tractor 21 and assists in extending the piston of cylinder 34 as at position 124 of FIGURE 19 and at FIGURE 8. After the implement subassembly 33 is almost in final position relative to tractor 21, as at position 125 of FIGURE 19 and FIGURE 15, continued action of pump 50 brings the cylinders 24 and 34 to full expanded position. The hydraulic cylinder 34 with lines and motor attached thereto acts as shock absorber as well as a positioner in the positions shown in FIGURES 3 and 4.

The arrangement of the assemblies 31 and 51 thus permit that the subassembly 23 may be rotated with a minimum of additional power requirement by the pump 50 for the cylinder 24 or other equivalent cylinder used to effect the rotation of a rotatable two-way plow subassembly as 23. This arrangement positively and definitely achieves a wide choice of spaced relations between the length of frame 83 and the path of travel as 100, 104, 106 of the tractor 21 by moving lug 38 along the frame 83 as desired. Valve body 109 is moved by handles 103 and/or 107 within the overall valve structure shown as 20.

It is also within the scope of this invention that the torque arm distance from the point of engagement of the rearmost first ground working tool as 43 to the line of tension through the longitudinal axis of the boom 25 may be made adjustable to increase (or decrease) the torque developed by the tension along arm 29 when it is desired to reduce (or increase, respectively) the pressure on the landside wheel. For this purpose an elongated splined cylindrical shaft 130 may be firmly attached onto the rotatable platform 40 with its longitudinal axis coaxial with the axis of rotation of that platform. The boom is correspondingly fitted with a female splined groove to smoothly yet closely fit that shaft. The longitudinal position of the boom relative to the longitudinal axis of the spline shaft is fixed by pins which may be placed in any of several holes in the splined shaft. Also, this distance of the boom along the longitudinal shaft may be adjusted by hydraulic means, as a hydraulic piston operated from the power takeoff of the tractor. This is especially useful when soil of varied degrees of moisture consistency is met which varies the difficulty of the passage of the plow board therethrough.

The apparatus of this invention provides for rigid bars as 97 and 98 firmly and rigidly attached to the lateral portion, i.e., the ends 91 and 92 of the frame 82 of harrow 80 and firmly and rigidly attached to the sides of the frame of the spring harrow 95. Thereby a frame for the treating implement assembly 33 is provided not only with many points of ground support therefor along the ground contact line of the blades of harrow 80 with the earth but also, longitudinally spaced away therefrom (i.e. spaced away along the direction of axis 56 of tractor 21) several points of ground contact of the spring harrow 95. The frame of harrow 95 is rigid and resists twist. This makes for stability of the subassembly 33 and permits synergism and cooperation between tools 80 and 95 not obtainable if they were joined only flexibly, e.g. as by chains in lieu of the bars 97 and 98; for instance, in the position of implements 80 and 95 shown at 1A in FIGURE 1, spiral harrow 80 and the harrow 95 dispose earth to their left and thereby provide a counterclockwise torque to arm 29 that takes the load off the landside wheel 69 and so avoids unnecessary earth compaction as well as added load on the tractor. Nevertheless, by the use of the joint subassemblies 51 and 31 and other components of the combination comprising the apparatus of this invention the implement subassembly 33 is conveniently and readily operated on either side of the two-way plow subassembly 23 as above described without requiring tilting or rotation about a horizontal axis of the subassembly 33.

The lug 37 may be pivotally yet firmly attached to the front of frame 83 for pivotal rotation about a horizontal axis and so minimize vertical strain on the rear end of arm 25. In the preferred embodiment shaft 61 of joint 51 and lugs 38, 32 and 37 are at the same vertical height and the angle between a straight line joining the axis of pins 32A and 37A and a straighet line between the axis of pins 38A and 37A is 50° (measured by pin 38A) in the embodiment above described in the position of arm 29 shown in FIGURE 3 and, similarly measured from pin 38A, 130° in the position of arm 29 shown in FIGURE 4, such angle being measured in a plane including the longitudinal axis of link arm 29 and passing through pins 31 and 38A.

Lug 38 is a horizontally extending sturdy steel ear attached to a vertical steel lug plate 108 as shown diagrammatically in FIGURE 14. Lug plate 108 has horizontally elongated slots near its lateral ends. Plate 108 is firmly supported by lug support plate bolts which are firmly attached on the frame 83 of harrow 80. Adjustment of lug 38 is effected by movement of the plate 108 horizontally in one direction or another to achieve the angular relations desired of harrow 80 with respect to arm 29. A line from pin 38A to 37A is parallel to the axis of rotation of the spiral harrow carried in the harrow 80.

The outwardly extending end of the movable piston 119 of power cylinder 34 is provided with an ear that pivotally engages pin 38A; the body of cylinder 34 has a lug that engages pivotally with pin 32A. It is this distance from the center or axis of pin 38A and 32A that varies from 20¼ inch to 28¼ inch as above discussed. The end of piston 24 pivotally engages with a control member that rotates subassembly 23; the body of cylinder 24 is pivotally yet firmly supported on tractor 21.

Although, in accordance with the provision of the patent statutes, a particular preferred embodiment of this invention has been described in detail and the principles of the invention have been described in the best mode in which it is now contemplated applying such principles, it will be understood that the constructions and procedures shown and described are merely illustrative and that the invention is not limited thereto and, accordingly, alterations and modifications which readily suggest themselves to persons skilled in the art without departing from the true spirit of the disclosure hereinabove are intended to be included in the scope of the annexed claims.

I claim:

1. Apparatus for mechanical earth treatment comprising, in operative combination, a first earth treating tool and means operatively attached thereto for movement thereof, relative to and along the direction of the surface of the earth, said means having a front end and a rear end, a straight line passing from said rear end to said front end passing in the direction of movement of said means for moving, said first earth treating tool being attached to the rear of the rear end of said means for moving and being adapted for use in either of two operative positions relative to the direction of said movement, said means for movement having a longitudinal axis and the direction of said first earth treating tool being parallel to said longitudinal axis; rotatable means attached to and supported by said means for moving and attached to said first earth treating tool for rotatably supporting said first earth treating tool and rotating said first earth treating tool from one operative position to the other about said longitudinal axis of said means for moving and operating means connected thereto for rotating said rotatable means; a rigid elongated means firmly attached to said rotatable means and extending rearward thereof to a point along the axis of rotation of said rotatable means, a rigid elongated spacing element connected by a universal joint at its proximal end to the distal end of said first rigid means, a straight line from the distal end of said rigid elongated spacing element to its proximal end forming the longitudinal axis of said element, and a second earth treating tool comprising a frame and a plurality of earth treatment implements attached thereto at intervals along the width of said frame, the distal end of said rigid elongated spacing element being attached to said frame by pivoted means fixed for pivotal rotation about a vertical axis, rigid extensible means pivotally attached at one end to said spacing element and at an opposite end to said frame of said second earth treating tool, means for extending and retracting said extensible means operatively connected thereto, a power source connected to a control means, said control means operatively connected to said means for rotating and to said means for extending and retracting, whereby said means for rotating and means for extending and retracting automatically operate concurrently when connected to said power source by said control means.

2. Apparatus as in claim 1 wherein said first earth treating tool is a two-way plow, said means for moving is a tractor, said tractor has an engine and said power source is a fluid motor connected to and driven by said engine.

3. Apparatus as in claim 2 wherein said control means includes means for delaying energy input from said power source into said means for extending and retracting while said power source is connected with said means for rotating.

4. Apparatus as in claim 2 wherein the longitudinal axis of said spacing element makes an angle with the longitudinal axis of said rotatable two-way plow means, whereby said longitudinal axis of the second earth treating tool is maintained parallel to the axis of the means for moving the first earth treating tool during the movement of said first earth treating tool along the direction of its longitudinal axis.

5. Apparatus as in claim 4 wherein the second earth treating means has at least three points of support on the ground, said support points do not lie on the first named straight line, and rigid means between said points maintain said points in fixed spatial relation to each other.

No references cited.

ABRAHAM G. STONE, *Primary Examiner.*

J. R. OAKS, *Assistant Examiner.*